(12) United States Patent
Wölpert

(10) Patent No.: US 6,468,053 B2
(45) Date of Patent: Oct. 22, 2002

(54) BLOWER

(75) Inventor: Gustav Wölpert, Waiblingen (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 09/733,564

(22) Filed: Dec. 8, 2000

(65) Prior Publication Data

US 2001/0005482 A1 Jun. 28, 2001

(30) Foreign Application Priority Data

Dec. 10, 1999  (DE) .......................................... 199 59 557

(51) Int. Cl.[7] .............................. F04B 39/00; F04B 53/00
(52) U.S. Cl. .................... 417/312; 417/423.14; 415/119
(58) Field of Search ............................ 417/312, 313, 417/423.9, 423.14, 423.2; 415/119, 211.1, 211.2, 206

(56) References Cited

U.S. PATENT DOCUMENTS

| | | | | |
|---|---|---|---|---|
| 4,413,371 A | * | 11/1983 | Tuggle et al. ................. | 15/405 |
| 4,644,606 A | * | 2/1987 | Luerken et al. ............... | 15/330 |
| 4,735,555 A | * | 4/1988 | Erickson, Jr. ............... | 417/244 |
| 4,950,133 A | * | 8/1990 | Sargent ....................... | 417/312 |
| 4,978,281 A | * | 12/1990 | Conger, IV ............ | 417/423.15 |
| 5,460,485 A | * | 10/1995 | Sugiyama et al. ....... | 415/208.2 |
| 5,567,127 A | * | 10/1996 | Wentz ......................... | 417/312 |
| 6,109,865 A | * | 8/2000 | Ishikawa ..................... | 415/98 |

FOREIGN PATENT DOCUMENTS

| | | | |
|---|---|---|---|
| JP | 408200064 A | * | 8/1996 |
| JP | 02000073762 A | * | 3/2000 |

* cited by examiner

Primary Examiner—Charles G. Freay
Assistant Examiner—Han L Liu
(74) Attorney, Agent, or Firm—R W Becker & Associates; R W Becker

(57) ABSTRACT

A blower for cleaning a surface is provided. The blower includes a radial blower that is driven by a motor and includes an impeller that is rotatable about a blower axis and a housing that at least partially surrounds the impeller. In the area of the blower axis, the housing is provided with an intake opening on an end wall that is disposed approximately perpendicular to the blower axis. A damping bell is disposed on the end wall in the region of the intake opening. The damping bell is provided with a damping panel that is disposed approximately parallel to and at a distance from the end wall, and covers the intake opening. The damping bell also includes a bell wall that extends about the intake opening and the damping panel in a collar-like manner. At least one intake window is provided in the bell wall.

15 Claims, 4 Drawing Sheets

BLOWER

BACKGROUND OF THE INVENTION

The present invention relates to a blower for cleaning a surface, and has a radial blower that is driven by a motor and includes an impeller that is rotatable about a blower axis and a housing that at least partially surrounds the impeller, whereby in the region of the blower axis, the housing is provided with an intake opening on an end wall thereof that is disposed approximately perpendicular to the blower axis.

Such blowers, which are used, for example, for cleaning leaves or the like from surfaces, are provided with a powerful radial blower. Due to the high air-conveying power and the speed, a great amount of noise is generated that is a considerable impairment not only to the user but also to the environment. As a consequence, the use of such blowers is limited in occupied areas and in rest or recreation areas. It can also be difficult to maintain increasingly stricter noise emission standards. A structural limitation of the conveying power, and in particular the flow velocity, leads to a reduced cleaning effect.

It is therefore an object of the present invention to improve a blower of the aforementioned general type in such a way that the noise emission during operation is reduced without significantly adversely affecting the cleaning effect.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
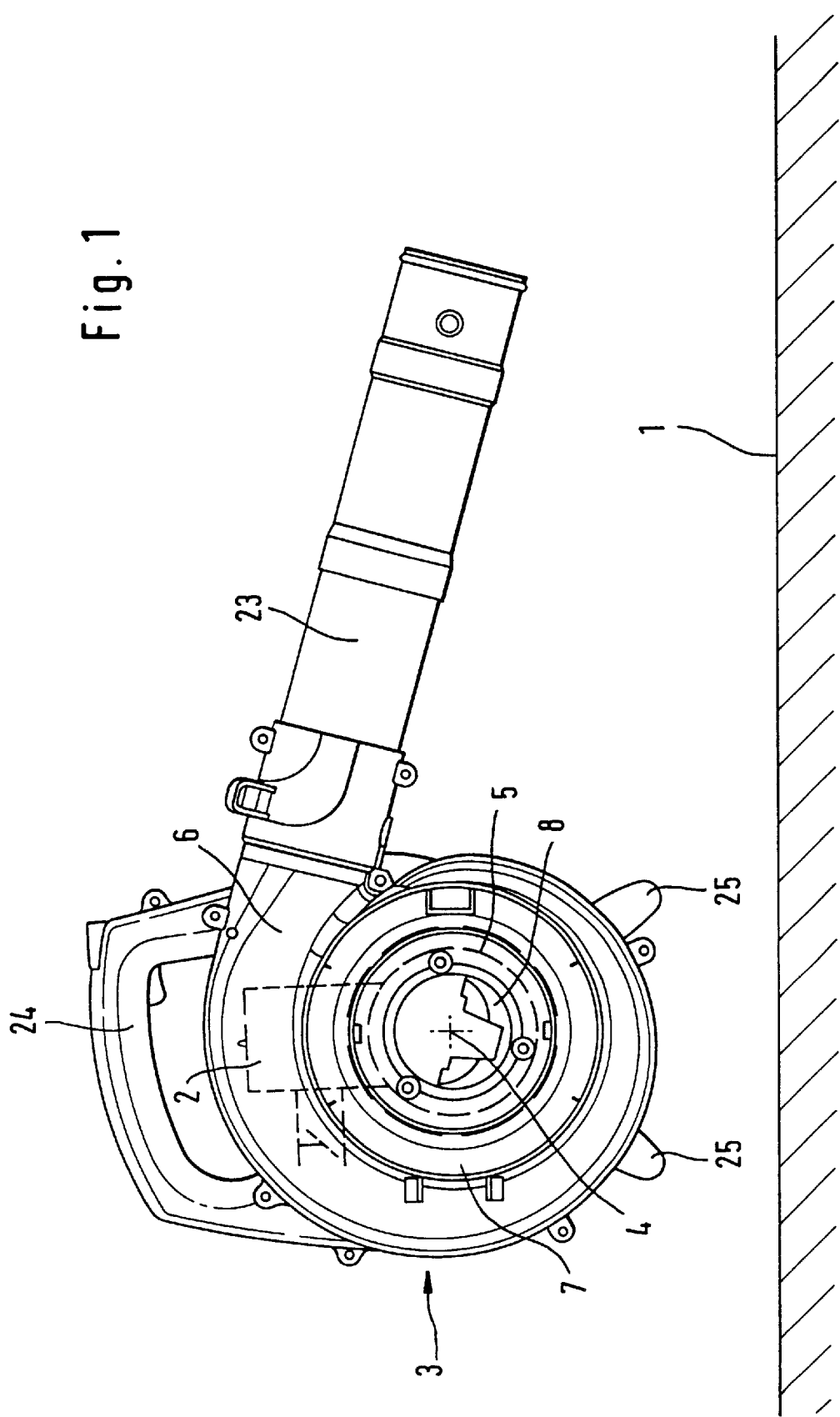
FIG. 1 is a schematic illustration of one exemplary embodiment of an inventive blower.

The blower of the present invention is characterized primarily in that disposed on the end wall of the housing is a damping bell that is provided with a damping panel that is disposed approximately parallel and at a distance from the end wall, and covers the intake opening, wherein the damping bell further includes a bell wall that extends about the intake opening and the damping panel, whereby at least one intake window is provided in the bell wall.

Thus, it is inventively proposed to mount on the end wall of the blower housing, in the region of the intake opening, a damping bell having a damping panel that is disposed approximately parallel to and at a distance from the end wall, and thereby covers the intake opening. As a consequence of this damping panel, a considerable portion of the sound energy that exits the intake opening approximately in the direction of the axis is either reflected into the intake opening or is absorbed in the material of the damping panel. By disposing a bell wall, which extends in a collar-like manner about the damping panel, holds the damping panel at a distance from the end wall, and extends about the intake opening, place is provided for a large intake window on the peripheral side, by means of which window fresh air is supplied to the intake opening and hence to the radial blower. Due to this arrangement on the peripheral side, only very little sound escapes, whereby expediently only one intake window is provided in the bell wall and which, relative to the operating position of the blower, is disposed in such a way that it is directed against the surface that is to be cleaned. In this way, the few sound waves that exit through the intake window strike the surface that is to be cleaned, where they are partially absorbed, especially if the surface that is to be cleaned is soft turf or the like. As a result, a further reduction of the noise level can be achieved.

Pursuant to one preferred specific embodiment of the present invention, the intake window is embodied in such a way that its effective cross-sectional flow area is greater than the cross-sectional flow area of the intake opening in the blower housing. In this way, the speed of the blower and hence the generation of noise are prevented from rising due to an increased flow resistance. In this connection, reinforcing ribs are expediently provided in the intake window and effect a mechanical reinforcement of the damping bell, even where the intake window is large. Furthermore, the reinforcing ribs form a protective grid for protecting the blower from large foreign objects and serve to maintain the specifications of the overall machine protection.

By disposing in the damping bell an air-guiding wall that is connected with the edge members of the intake window and with the damping panel in such a way that it extends about the intake opening in the end wall, it is possible to achieve a defined air flow from the intake window to the intake opening with little turbulence. Due to the reduction of the turbulence, the noise level is further reduced. In this connection, a sealing lip is preferably mounted on that abutment edge that rests upon the end wall, thereby avoiding drawing in secondary air. This contributes to the reduction of the turbulence. The space formed by the air-guiding wall, the damping panel, and the bell wall can be used as a further dampening chamber for structure-borne noise; by providing dampening material, especially material that is foamed in, it is possible to have a good absorption of noise.

To further reduce the structure-borne noise, the damping panel, on that side thereof that faces the intake opening, can be provided with a dampening plate which in a simple manner is positively held in a retaining collar. By disposing the dampening plate on that side that faces the intake opening, it is protected by the coupling bell against mechanical damage from the outside. Dirt-repelling material is advantageously selected for the dampening plate.

By means of a one-piece configuration of the air-guiding wall and the retaining collar with the damping bell, in addition to reducing the manufacturing and assembly costs it is also possible to avoid vibration noises. By embodying the damping bell in injection molded polymeric material, and in particular in polyamide, in addition to being able to endure high mechanical stress, a good material damping is provided and hence a further reduction of the structure-borne noise can be achieved.

Further specific features of the present invention will be described in detail subsequently.

DESCRIPTION OF PREFERRED EMBODIMENTS

Referring now to the drawings in detail, the blower illustrated in FIG. 1 is provided with a radial-flow blower 3 that is driven by a motor 2, which is schematically indicated by dashed lines as an internal combustion engine. The radial blower 3 can also be driven by an electric motor. A blower impeller 5, which rotates about the blower axis 4, is provided in the blower housing 6 and is connected to the motor 2. In cooperation with the blower housing 6, the impeller 5 draws air in via the intake opening 8 and blows air out, in an accelerated manner, via the blower or discharge tube 23. The intake opening 8 is centrally disposed relative to the blower axis 4 in the end wall 7 of the blower housing 6. To place the blower upon a surface or ground 1, two feet 25 are provided on the periphery of the spiral-shaped blower housing 6. Mounted on a side opposite to the feet 25 is a handle 24 for carrying and operating the blower. The blower is illustrated in the operating position that is provided relative to the surface 1 that is to be cleaned, whereby the discharge tube 23 is inclined at a flat angle to the surface 1.

Figure 2:
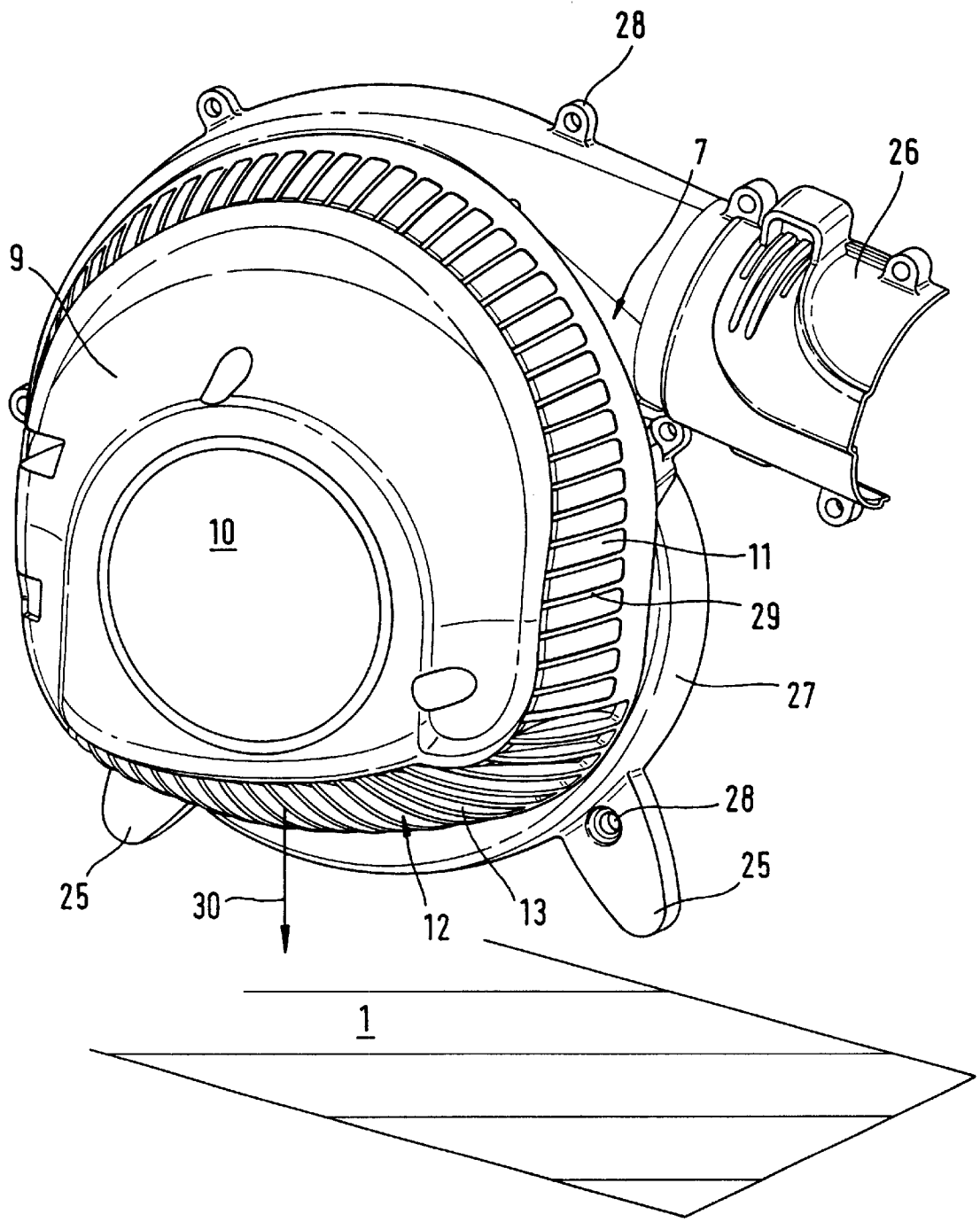
FIG. 2 is a perspective view of a portion of the housing of the radial blower of FIG. 1, with a damping bell placed thereon.

The housing 6 of the blower of FIG. 1 is formed of assembled sections, with one half section 27 being shown in the perspective illustration of FIG. 2. Integrally formed on the half section 27 are a discharge connector 26 for receiving the discharge tube 23, the feet 25, as well as a plurality of eyes 28 for screws for effecting a connection with the other housing section. Mounted on the end wall 7 is a damping bell 9 having a damping wall or panel 10 and a bell wall 11 that surrounds the damping panel 10 in a bell-shaped manner. The damping panel 10 of the damping bell 9 covers the intake opening 8 (FIG. 1). An intake window 12, which has reinforcing ribs 13 provided therein, is disposed in the bell wall 11; the window direction 30 is directed against the surface 1 that is to be cleaned. In the remaining peripheral portion, the bell wall 11 is thin and is reinforced by ribs 29. The damping bell 9 has a peripheral contour that corresponds approximately to the spiral shape of the blower housing 6. The peripheral contour of the damping bell 9 is flattened in the area of the feet 25, so that when the blower is placed upon the surface 1 with the motor 2 running, an excessive drawing-in of dirt particles through the intake window 12 is avoided.

Figure 3:
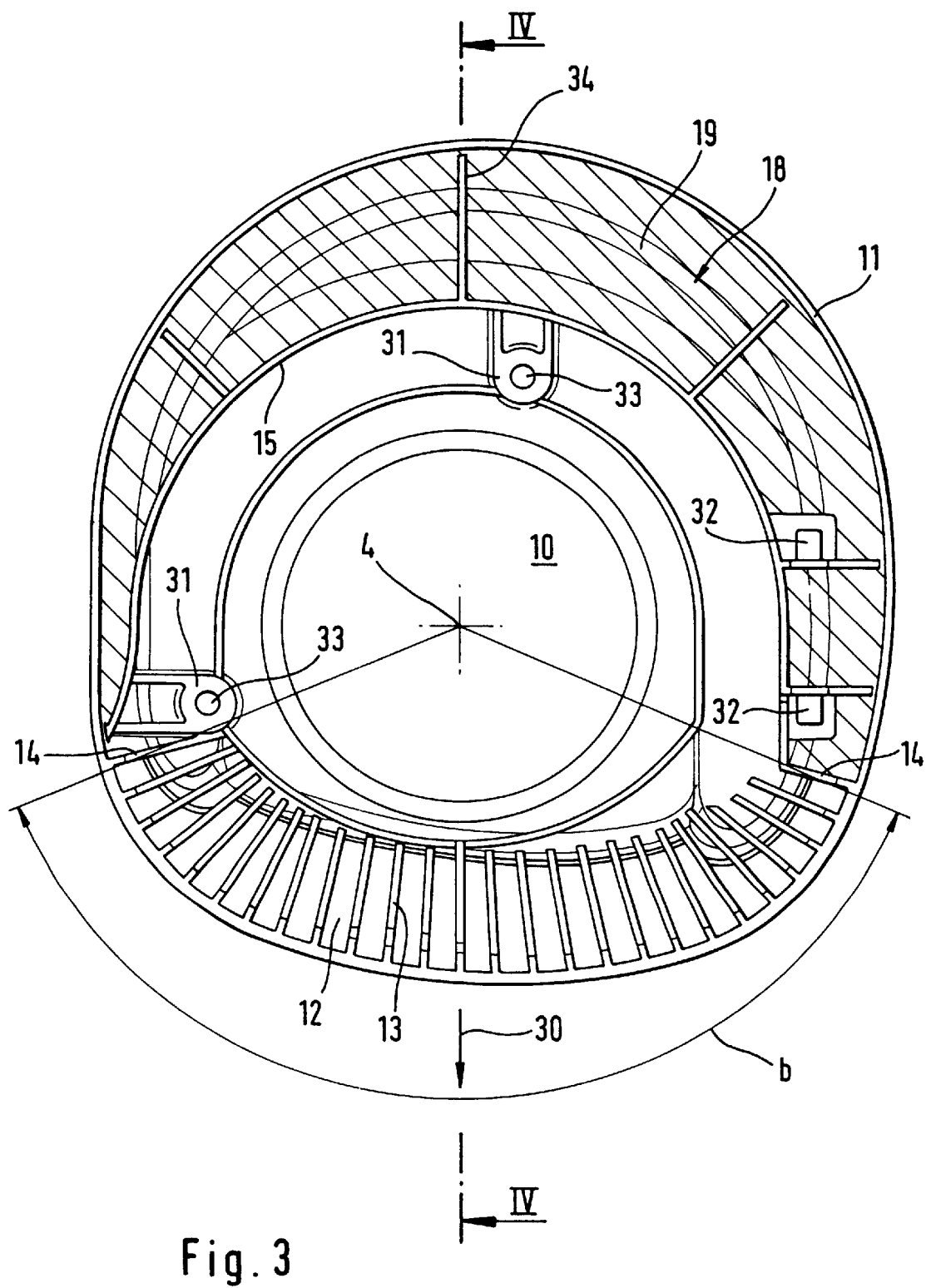
FIG. 3 is a view from the inside of the damping bell of FIG. 2.
Figure 4:
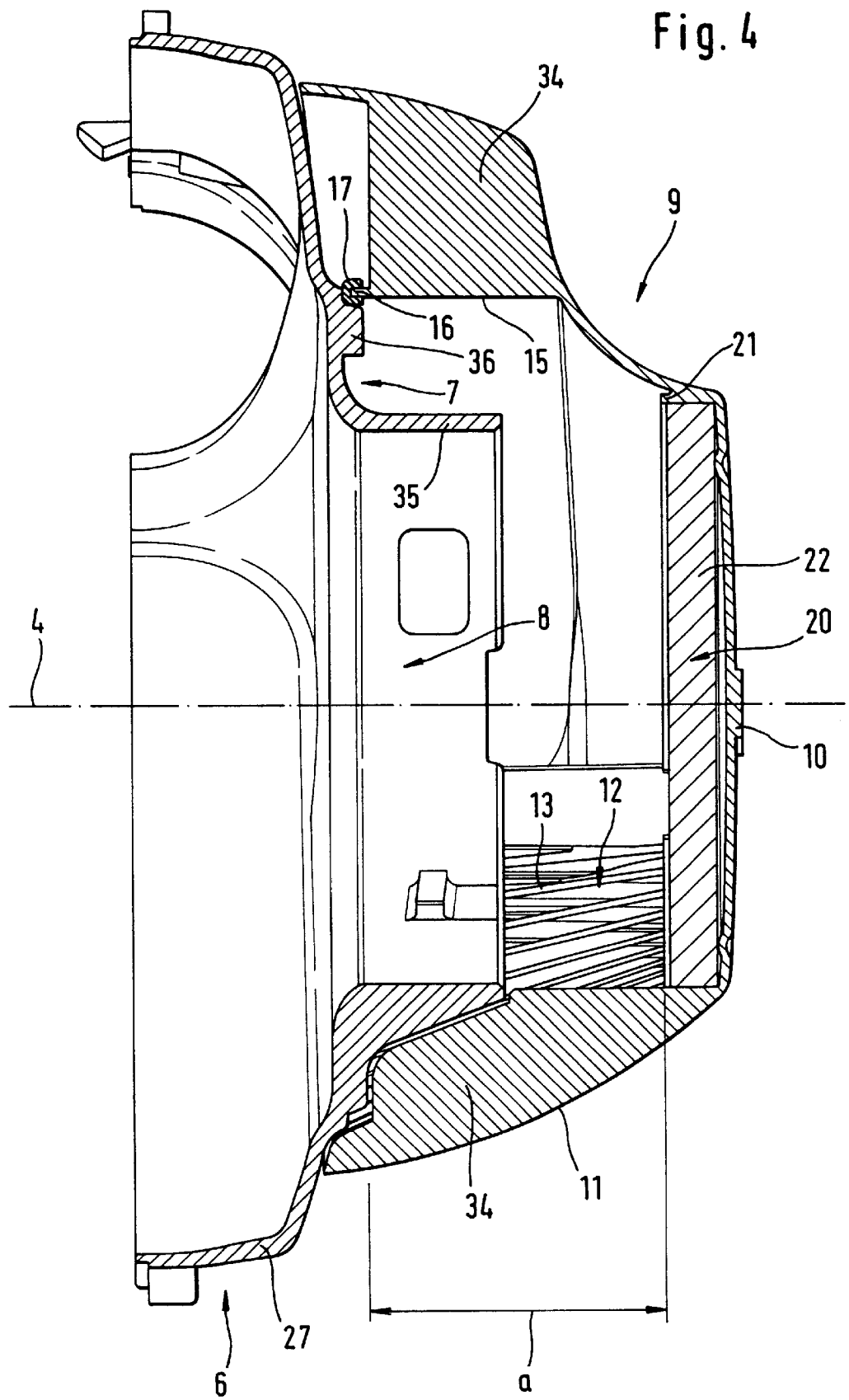
FIG. 4 is a cross-sectional view through the damping bell taken along the line IV—IV in FIG. 3.

The connection of the damping bell 9 to the blower housing 6 according to FIG. 2 can be effected by screws, spring clamps, quick-release closures, etc. From the internal view of the damping bell 9 illustrated in FIG. 3 it can be seen that, to the side of the intake window 12, two pivot pins 32 are provided for the securement to the blower housing 6 and are integrally formed with the damping bell 9. The damping bell 9 is pivotable about the pivot pins 32 for servicing and cleaning the radial blower 3 (FIG. 1), and the damping bell 9 is held in the closed position shown in FIG. 2 by two screw connections 33. For this purpose, two screw domes 31 that are integrally formed with the damping bell 9 are provided. The intake window 12 with the reinforcing ribs 13 provided in the bell wall 11 extends in the peripheral direction approximately symmetrically relative to the window direction 30 and spans an angular range b relative to the blower axis 4. The angular range b, and the distance a which is explained in greater detail in conjunction with FIG. 4, are dimensioned such that the cross-sectional area of the intake window 12 is greater than the cross-sectional area of the intake opening 8 of FIG. 1. In the peripheral direction, the intake window 12 is delimited at the sides by edge members 14. An air-guiding wall 15 is connected with the damping panel 10 and the edge members 14, and is formed approximately in the shape of a partial cylinder, so that in the closed state of the damping bell 9 of FIG. 2, the air-guiding wall 15 extends about the intake opening 8 on that side opposite the intake window 12. Together with the damping panel 10 and the bell wall 11, the air-guiding wall 15 forms a damping chamber 18 that is divided by ribs 34 and in which is introduced a dampening material 19, which is preferably introduced by being foamed in.

The cross-sectional view of FIG. 4 shows the half section 27 of the housing 6 with the intake opening 8, which is delimited concentrically relative to the blower axis 8 by a collar 34. The damping bell 9, which is mounted on the end wall 7 of the housing 6, is shown in the closed position. The damping panel 10 is disposed approximately parallel to the end wall 7 and is spaced therefrom by the distance a; viewed in the direction of the blower axis 4, the damping panel 10 covers the intake opening 8. On that side of the damping panel 10 that faces the intake opening 8 a dampening plate 20, which is comprised of a dirt-repelling material 22, is positively held by a retaining collar 21; the dampening plate 20 can, of course, also be glued in, or can be held by spring clamps or the like. The air-guiding wall 15 surrounds the intake opening 8 beyond the collar 35, with its abutment edge 16 resting upon the end wall 7. Provided on the abutment edge 16 is a sealing lip 17 by means of which in the axial direction the abutment edge is sealed relative to the end wall 7, and in the radial direction is sealed against a bead 36 that is provided on the end wall 7. The damping bell 9, the air-guiding wall 15, the retaining collar 21, and the ribs 35, which are illustrated in cross-section, are monolithically formed of injection molded polyamide.

The specification incorporates by reference the disclosure of German priority document 199 59 557.7 of Dec. 10, 1999.

The present invention is, of course, in no way restricted to the specific disclosure of the specification and drawings, but also encompasses any modifications within the scope of the appended claims.

What I claim is:

1. A blower for cleaning a surface, comprising:
   a radial blower (3) that is driven by a motor (2) and includes a housing (6) that at least partially encloses an impeller (5) that is rotatable about an axis (4) of the radial blower (3), wherein said housing (6) has an end wall (7) that is disposed approximately perpendicular to the blower axis (4), and wherein said end wall, in the vicinity of said axis, is provided with an intake opening (8); and
   a damping bell (9) disposed on said end wall (7), wherein said damping bell is provided with a damping panel (10) that is disposed approximately parallel to and at a distance a from said end wall (7), wherein said damping panel (10) covers said intake opening (8), wherein said damping bell (9) further includes a bell wall (11) that extends about said intake opening (8) and said damping panel (10), and wherein at least one intake window (12), is provided in said bell wall (11).

2. A blower according to claim 1, wherein said intake window (12) is adapted to be directed against a surface that is to be cleaned.

3. A blower according to claim 1, wherein said at least one intake window (12) has a cross-sectional area that is greater than a cross-sectional area of said intake opening (8).

4. A blower according to claim 1, wherein said at least one intake window (12) is provided with reinforcing ribs 13.

5. A blower according to claim 1, wherein an air-guiding wall (15) is disposed in said damping bell (9), wherein said air-guiding wall is connected with said damping panel (10) and edge members (14) of said at least one intake window (12), and wherein said air-guiding wall (15) extends partially about said intake opening (8).

6. A blower according to claim 5, wherein said air-guiding wall (15), on a side thereof that faces said end wall (7), is provided with an abutment edge (16), and wherein a sealing lip (17) is disposed on said abutment edge (16) and rests upon said end wall (7).

7. A blower according to claim 5, wherein said damping panel (10), said bell wall (11), and said air-guiding wall (15) form a damping chamber (18), and wherein dampening material (19) is provided in said damping chamber.

8. A blower according to claim 7, wherein said dampening material (19) is foamed into said damping chamber (18).

9. A blower according to claim 5, wherein a side of said damping panel (10) that faces said intake opening (8) is provided with a dampening plate (20).

10. A blower according to claim 9, wherein said damping panel (10) is provided with a retaining collar (21), and wherein said dampening plate (20) is positively held by said retaining collar.

11. A blower according to claim 9, wherein said dampening plate (20) comprises a dirt-repelling material (22).

12. A blower according to claim 10, wherein said damping bell (9), said air-guiding wall (15), and said retaining collar (21) are monolithically formed.

13. A blower according to claim 1, wherein said damping bell 9 is made of injection molded polymeric material.

14. A blower according to claim 13, wherein said damping bell (9) is made of polyamide.

15. A blower for cleaning a surface, comprising:

a radial blower (3) that is driven by a motor (2) and includes a housing (6) that at least partially encloses an impeller (5) that is rotatable about an axis (4) of the radial blower (3), wherein said housing (6) has an end wall (7) that is disposed approximately perpendicular to the axis (4), and wherein said end wall, in the vicinity of said axis, is provided with an intake opening (8); and a damping bell (9) disposed on said end wall (7), wherein said damping bell is provided with a damping panel (10) that is disposed approximately parallel to and at a distance a from said end wall (7), wherein said damping panel (10) covers said intake opening (8), wherein said damping bell (9) further includes a bell wall (11) that extends about said intake opening (8) and said damping panel (10), and wherein at least one intake window (12) is provided in said bell wall (11), wherein an air-guiding wall (15) is disposed in said damping bell (9), wherein said air-guiding wall is connected with said damping panel (10) and edge members (14) of said at least one intake window (12), and wherein said air-guiding wall (15) extends partially about said intake opening (8).

\* \* \* \* \*